(12) United States Patent
Ben Shahar

(10) Patent No.: US 8,407,208 B2
(45) Date of Patent: Mar. 26, 2013

(54) METHOD FOR MATCHING QUERIES WITH ANSWER ITEMS IN A KNOWLEDGE BASE

(75) Inventor: Amit Ben Shahar, Petah Tikva (IL)

(73) Assignee: Nanorep Technologies Ltd, Herzliya Pituah (IL)

( * ) Notice: Subject to any disclaimer, the term of this patent is extended or adjusted under 35 U.S.C. 154(b) by 33 days.

(21) Appl. No.: 13/019,318

(22) Filed: Feb. 2, 2011

(65) Prior Publication Data

US 2012/0197939 A1 Aug. 2, 2012

(51) Int. Cl.
*G06F 7/00* (2006.01)
*G06F 17/30* (2006.01)

(52) U.S. Cl. ...................................................... 707/715

(58) Field of Classification Search .................... 707/715
See application file for complete search history.

(56) References Cited

U.S. PATENT DOCUMENTS 5,721,902 A * 2/1998 Schultz ................................. 1/1
2002/0147716 A1 * 10/2002 Namba ............................. 707/5

\* cited by examiner

*Primary Examiner* — Hosain Alam
*Assistant Examiner* — Van Oberly
(74) *Attorney, Agent, or Firm* — Vladimir Sherman; Professional Patent Solutions

(57) ABSTRACT

A system for providing answers to questions presented in the form of electronic signals representing natural language words conveyed to said system by way of a network connected to a computer. The system includes a plurality of search indexes relating to a field of knowledge, each in a specific natural language. A store house of natural words is associated with each one of the search indexes, in which a list of natural words is maintained in an order reflecting the usage frequency of said words in that list. In addition, a language storehouse of natural words common to each of the search indexes associated each with a specific natural language. The search index includes a list of score ordered keywords, indexed answer items each associated with an internal list of references (ILOR) pointing to it, and a list of ordered numerical references associated with each of the ordered keywords. Each such reference represents quantitatively an association between the keyword and an indexed answer item.

4 Claims, 6 Drawing Sheets

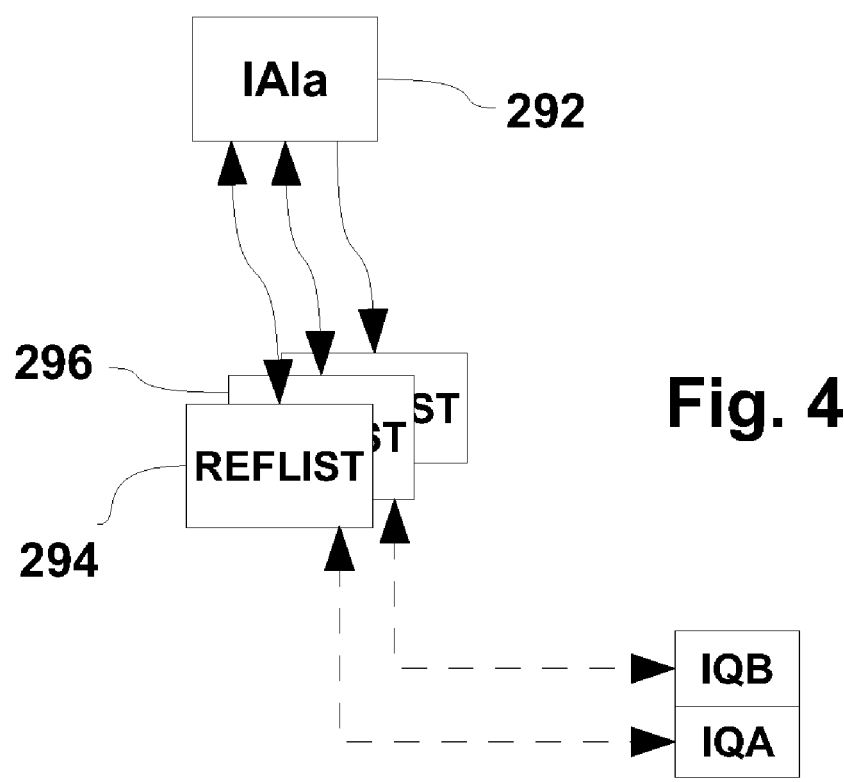

METHOD FOR MATCHING QUERIES WITH ANSWER ITEMS IN A KNOWLEDGE BASE

FIELD OF THE INVENTION

The present invention relates to an expert system, functional for providing answers to users presenting queries in specified fields.

BACKGROUND OF THE INVENTION

Expert systems attempt to provide answers to problems in a specific domain, with the intent of at least partially replacing human experts. Expert system reasoning often tries to imitate human reasoning. Since expert systems are to do with human reasoning and communications, understanding and utilizing human words is a crucial factor if a natural language is used for querying the expert system. The two most significant components of an expert system are the expert system shell and the knowledge base. The expert system shell handles interpretation of user input into the system in order to facilitate the reasoning. The knowledge base of an expert system is the factual body consisting of information and relationships between the elements of information arranged in such a way as to fulfill the purpose of the expert system. The knowledge base does not necessarily contain definitive rules to prioritize between options or rule out others altogether.

The Internet offers a practical medium for users to interconnect with an expert system. The convenience and availability of Internet browsers enable most users to benefit from the knowledge managed by specific expert systems almost without limitations of location. Moreover, the ubiquitous access users may now have to knowledge bases through personal hand held communications end points, encourages the need for the diversification in knowledge domains, so that one could derive quick answers for an increasing amount of fields of knowledge.

SUMMARY OF THE INVENTION

An expert system in which a search index furnishes answers to incoming queries provided in natural language. A search index for a specific field contains components that facilitate selecting a best fitting stored answer to the incoming query. A language specific storehouse of weighted words and a private storehouse of weighted words associated with a field—specific search index provide the basis for evaluating the significance level of a natural language word of a query. A procedure elects candidates from a store of indexed answers to match the incoming query to first form a list of candidates, based on the existence of identical or similar words. Then, from the list of available candidates, one that provides the best match is selected. The final selection takes into account the influence of the excess of less significant words. A candidate is derogated if it is found to contain a larger number of less significant words as compared to another candidate containing a smaller number of insignificant words.

BRIEF DESCRIPTION OF THE DRAWINGS

The invention may be understood upon reading of the following detailed description of non-limiting exemplary embodiments thereof, with reference to the following drawings, in which:

FIG. 4 is a graphical presentation of a situation in which a number of reference lists are associated with one indexed answer item.

DETAILED DESCRIPTION OF EMBODIMENTS OF THE INVENTION

The present invention is a multi-field expert system, meaning that implementing the invention will facilitate for a user the extraction of data in a plurality of fields of knowledge. For each of those fields of knowledge, a unique index is created that contains the knowledge of that specific field, and provides a means to retrieve that knowledge in response to natural language queries.

In accordance with the present invention, queries are presented as electronic signals representing natural language words to a search index (SI). The queries are further analyzed and responses provided, based on the existing knowledge base for that specific SI. It is also possible to direct searches to multiple fields at a time. An additional feature of the present invention is that each incoming query (IQ) having been reciprocated by an answer can and may be used to contribute to the performance of the knowledge base. This aspect of the invention will be explained later on. The analytic approach, in accordance with the present invention, attempts to analyze an incoming query and find an indexed answer item (IAI) that the expert system would be able to further use in an optimal way to provide the best answers.

An IQ undergoes a process which, for reasons of convenience of explanation, will be considered hereinafter as consisting of several procedures, some of which are executed in an ordered succession. The first procedure is a pre-processing procedure (PPP), in which an incoming query is evaluated for some administrative properties, for example language, general field of commerce, technology etc, and for misspelling and validity. Additionally, in the PPP, a private storehouse of weighted words is assigned to the IQ. Some of the consequences of the PPP will be dealt with below.

Figure 1A:
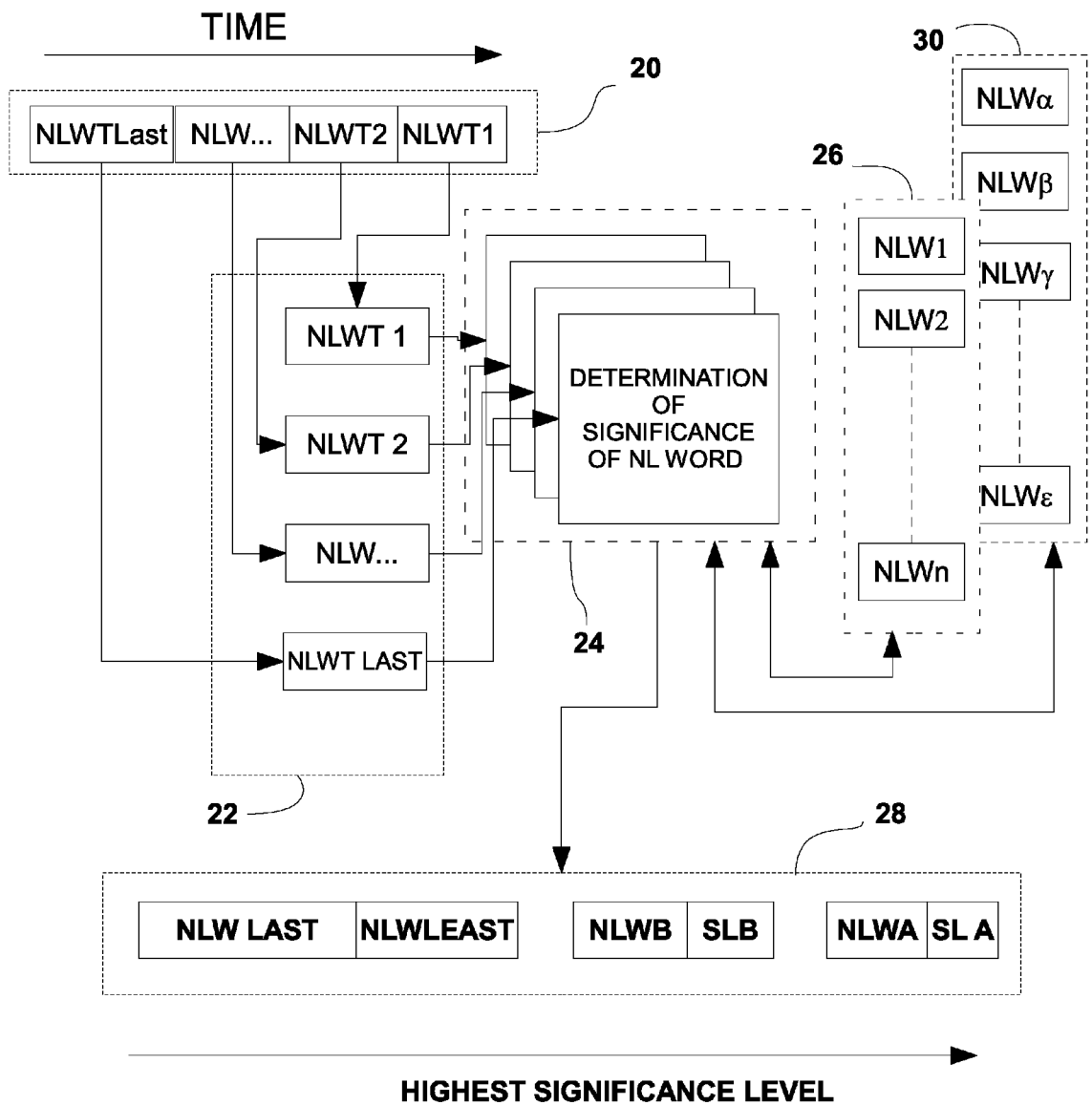
FIG. 1A is a graphical presentation of the flow of words arriving from a user to be subsequently given a significance level.

Subsequently, in the analytic procedure performed on the IQ, a significance level score is to be given to the fragments of the IQ, this will be explained with reference to FIG. 1A, showing a symbolic description of the way in which it is accomplished. Incoming query 20 arrives, for example, by way of a communications network running a TCP/IP communications protocol and is received by a server connected to the network. Such a server invokes a program, extracting information from the natural language (NL) query arrived, which includes the words and possibly additional information as to which of the one or more SIs are to be searched. Assuming, by way of example, that the query is a sentence composed of a succession of words making sense to a person versed in a specific language and having practical knowledge in a field about which the knowledge base is chartered to provide a service, the IQ is first fragmented and in a typical case, information extracted. The fragments form a succession of natural language words (NLWs) lined up in a queue 22 to be submitted each to a contesting routine 24, in which each word is weighed by finding a match in a natural language word storehouse 26 of weighted words. In the storehouse of words, each entry, such as a word symbolized by NLW2, has an associated numerical weight. Typically, the NLWs are processed in the order in which they arrive. The role of contesting routine 24 is to determine the significance level (SL) score associated with each incoming word, designated NLWT1, NLWT2 etc. The temporal succession of words of original IQ 20 is then reordered to give a new succession 28 referred to hereinafter generally as ordered query word succession (OQWS), in which the NLW with the highest significance level becomes associated with the highest position in the new succession, as described graphically, a certain NLW of the IQ becomes associated with SL score A, and a certain, other NLW becomes associated with a SL score "least". Other NLWs occupy intermediate positions in the OQWS as determined by their level of significance (SL). It cannot be ruled out, statistically, that on occasions the new order is the same as the order of arrival of NLWs. The storehouses of weighted words are dynamic entities which are constantly recompiled and their maintenance will be discussed later on. The assignment of a significance level to each of the incoming NLWs marks the completion of the contesting routine 24 as relates to query 20. As an example, in the question: "where can I find a library?" the word "I" is almost insignificant, the same can be said about "can". The word "find" is however more indicative because it relates to a fact that the person asking is searching for something which has practical meaning. The most significant word would be in this case "library". However, in other examples, the same word may receive different weights. Contesting routine 24 which determines the SL score of each NLW (in this case from the IQ), operates as follows:

Routine 24 references both NL storehouse of weighted words 26 which is private in the context of the current SI, and storehouse 30 which is common to all SIs for the same language (i.e. English). Each NLW storehouse (the SI private storehouse 26, and the language storehouse 30) maintains a respective SL score for each contained NLW. These scores are determined by distributing the NLWs by their respective usage frequency on a logarithmic scale, such that the most common word has the lowest SL score, and the least common NLW gets the highest score. Typically resulting scores are normalized to a scale of 0 to 100. In the routine, each NLWT obtains a SL score by weighing both the SL score component of the private storehouse 26 and the SL score component obtained from the language storehouse 30, such that the significance given to each word in an IQ is a value reflecting its combined relevance both with respect to the present SI and field of knowledge and with respect to the language generally. To demonstrate the difference in the two aspects, the word 'shoe' can be considered indicative of context in the scope of the English language, but is very common and much less significant in the scope of a footwear related knowledge-base.

Figure 1B:
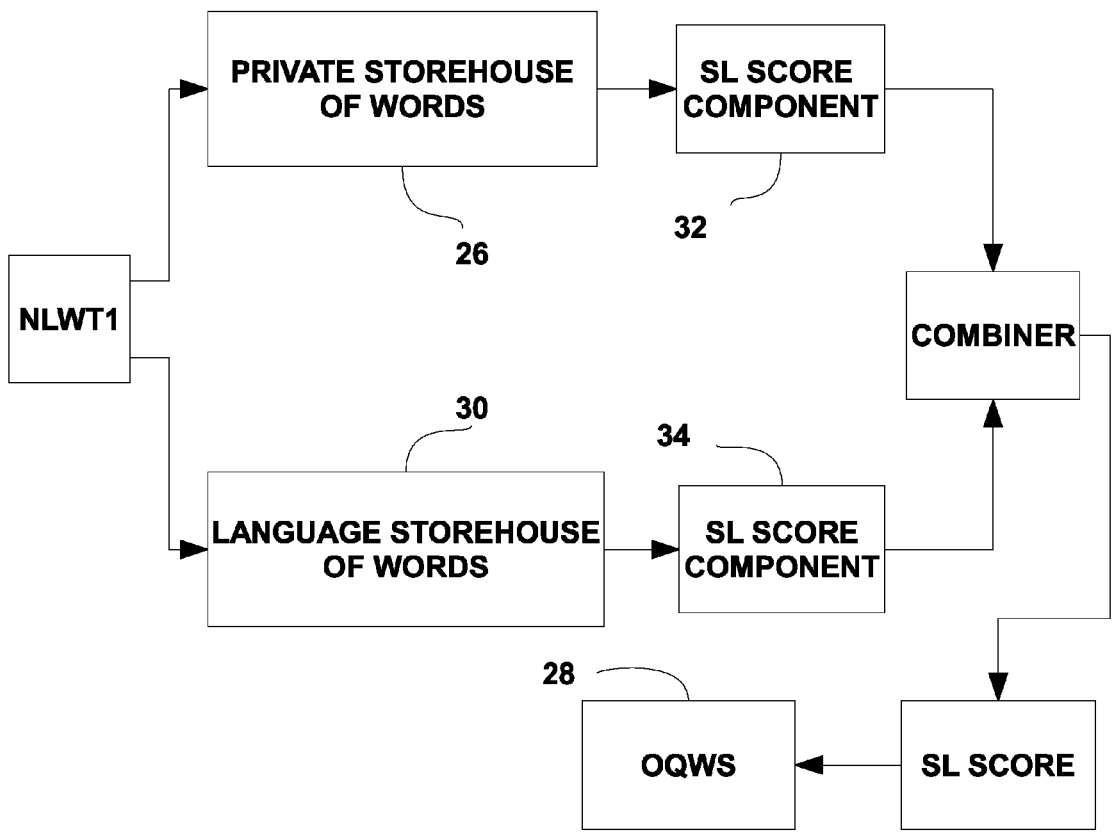
FIG. 1B is a graphical presentation of the summary of the contesting routine.

Finally, after each word is assigned its SL score, the words are reordered by their SL score and the SL scores are typically normalized. In a preferred embodiment of the invention, the scores are normalized, starting with the most significant NLW, which is typically set to a 100 (or 1, depending on the scale). Thus the second NLW is assigned, for example, to 75. The ratio between the references is typically kept the same after normalization. For example if NLWA was 50 before normalization, after normalization it becomes 100, and the next NLW, SLWB was 25, is normalized to 50, keeping the same ratio with the first NLW normalization factor. To summarize the issue of associating each word of queue 22 with a SL score, reference is made to FIG. 1B. NL word NLWT1 is contested with private storehouse of words 26, receiving a SL score component 32. Concomitantly, language storehouse of words 30 is contested with NLWT1, producing a respective SL score component 34. Both SL score components are then combined to produce a SL score which is now associated with NLWT1. The NLWs of a certain IQ are then arranged in a OQWS 28, in the order of their respective SL scores. One example of attaining such a combination is by performing weighted averaging, while giving one factor a different weight than the other. Finally their SL score is normalized, in the OQWS.

Figure 2A:
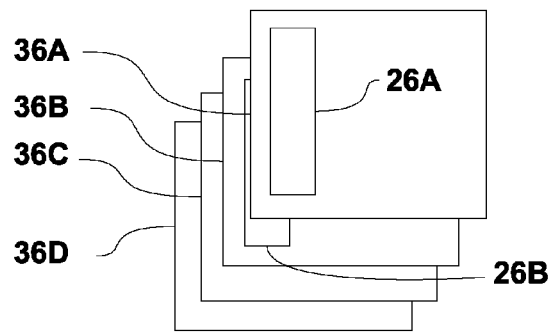
FIG. 2A is a graphical presentation of the usage of a plurality of search indexes.

The Search Index (SI) Component, and the Searching and Finding Best Match Procedure (SFBMP): Traversing IAIs The next procedure, which follows in the analytical sequence, is the selecting of the best matching indexed answer item for the IQ out of a selected few. Before explaining the procedure, the index component of a system of the invention is introduced. First, reference is made to FIG. 2A. For each private storehouse of weighted words a certain SI 36 exists which relates to this private storehouse. Thus SI 36A relates to private storehouse of words 26A of a certain field of knowledge, and SI 36B relates to private storehouse of words 26B of another field of knowledge.

Figure 2B:
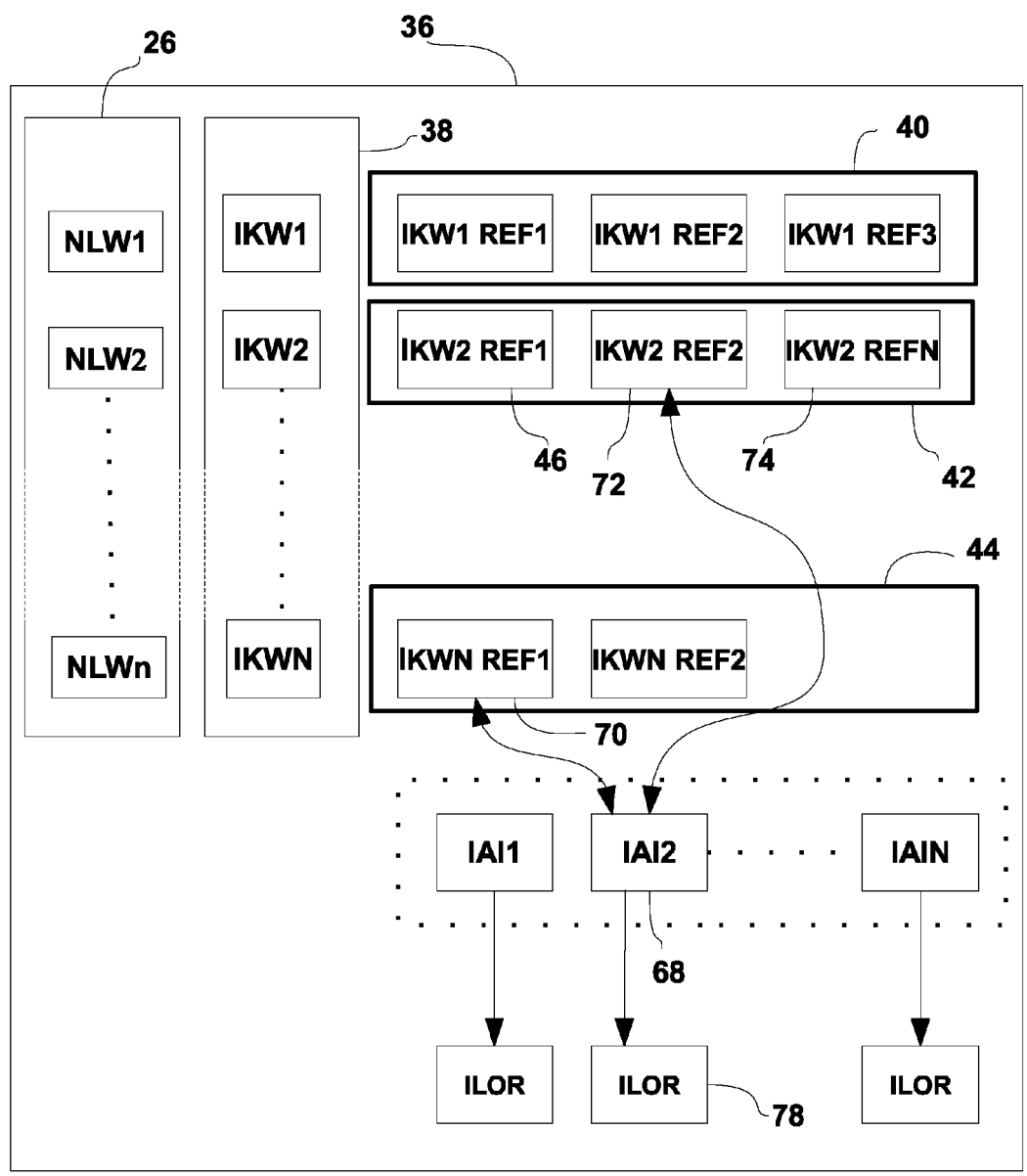
FIG. 2B is a graphical presentation of the components of the indexing component.

As explained above, private storehouse of weighted words 26 contains a list of words each associated with a weight which reflects its potential significance. More is described about the structure of SI with reference to FIG. 2B. SI 36 includes a list of indexed keywords 38, all of which keywords bear equivalence to a respective word in a private word storehouse 26, thus IKW1, an indexed key-word, is equivalent to NLW1 in the private storehouse 26 and also equivalent to a NLW in the language storehouse 30, for example NLWα. Each indexed keyword is associated with a list of Indexed Keyword References. For example list of reference (LOR) 40 is associated with indexed word IKW1, and list of references (LOR) 42 associated with indexed word IKW2. An indexed keyword reference (IKW REF) represents an association of an IKW and an IAI with a SL score, typically calculated by contesting routine 24. A LOR may sometimes contain only one reference. In each LOR, the order of references is the order which quantitatively reflects the SL score of the association between the IKW and the IAI, presented as a numeric value, meaning the IKW REF that bears the strongest association with an IAI will be positioned first in the LOR. For example, LOR 42, contains several references, all associated with indexed key word IKW2, and the first reference, designated 46 bears the highest SL score of all IKW References in LOR 42. The term IKW reference, stems from the fact that each IKW reference (IKW REF) in index 36 refers to only one specific indexed answer item (IAI) (one-to-one relationship). The mutual relationship is not symmetrical, and each IAI can refer or receive reference to and from a number of IKWs (one to many relationship), the only restriction is that an IAI can refer to only one IKW REF in a specific LOR. Each IAI points to an Internal List of References (ILOR), containing all the references pointing to it, possibly from a plurality of LORs. For example IAI2 designated item 68, contains ILOR 78 that refers to two IKWs, i.e. IKWN REF1 designated item 70 of LOR 44 and to IKW2 REF2 designated item 72 of LOR 42.

Searching and Finding a Best Fitting Indexed Answer Item for an IQ (SFBMP)—Making a Collection of IAIs, a List of Candidates Once a new query is presented to the system, contesting routine 24 constructs a OQWS, containing a weighted list of natural words. Then, the SFBMP is invoked. For each NLW of the IQ, a search is conducted finding the appropriate IKW in the appropriate SI. NLWA is the first word in the OQWS, having a highest SL score. It is associated with NLW1 in the private storehouse of weighted words 26 (and NLWα of the language storehouse 30), and with an indexed keyword IKW 1. The SFBMP searches, proceeding to traverse each of the LORs referenced by the IKWs referenced by the search query, and for each of the IKW REFs in those LORs, it will in turn traverse the ILOR contained in each IAI referenced by a traversed IKW REF.

There are two traversal strategies available for determining the order of traversal of each LOR, the sequential strategy, in which traversing the REFs is in order of SL score (LORs are sorted by SL score), and another strategy, a "Similarity First" search strategy, the traversal of the LOR starts from the IKW REF having a SL score most similar to the weight in the NLW for the IQ, and subsequently continues to the least similar one (possibly favoring higher positive or negative differences between the SL similarity making the search expansion asymmetrical). In addition, in a preferred embodiment of the invention, both strategies may only traverse a portion of the LOR, the portion size may be in proportion to the SL for the contested NLW in the IQ, bringing about an effective mechanism to limit traversal for low SL score LORs, which are by definition longer and generally contain less relevant IAI. For example: For NLWA with SL=100, 100% of the LOR's references will be traversed, and for NLWB with SL=50, only 50% of the LOR's references will be traversed.

To demonstrate a sequential search procedure, the following example is given: Looking first in LOR 40 associated with IKW1, to find its highest SL scoring IKW1 REF, i.e. IKW1 REF 1. This demonstrates the fact that the order of NLWs in the OQWS dictates the order of search inside the SI. The higher the SL scoring of a NLW in the OQWS is, the earlier it will be visited. In another example (also of a sequential strategy): NLWn is a NLW in the private storehouse of weighted words 26, equivalent to IKWN in the index. Associated with IKWN is LOR 44, and the highest SL scoring IKWN reference in LOR 44, IKWN REF1 is automatically selected as a first reference to be traversed in the search. This IKWN REF1 designated 70, points at IAI2, designated 68, at this point the procedure will initiate traversal of IAI2's ILOR 78 until completing all items referenced in the IAI's ILOR (in this example the next item to be traversed will be IKW2 REF2 designated 72), and then continue the traversal of the IKWN's LOR (in this example LOR 44) and the next item to be traversed will be IKWN REF2. When finishing one NLW, the procedure continues to the next NLW, i.e. NLWB in OQWS 28, etc.

During the search procedure, if an IKW points at an IAI which was already traversed in the current SFBMP (typically by a reference from a different LOR) it is not processed again. As the procedure traverses index 36, for each traversed IAI, a match level score (MLS) is calculated that is indicative of the perceived similarity between each traversed IAI and the IQ. During the traversal, a collection of relevant IAIs is accumulated, referred to hereinafter elected IAIs. In order to obtain from a list of elected IAIs the best matching IAI for the IQ, the calculated match level score MLS will ultimately be used to determine the best match, in response to the query.

SFBMP: Calculating the Match Level Score (MLS)

MLS calculation is accomplished in two steps. The first step calculates a Similar Words Score (SWS) by matching two sets of NLWs having each a respective SL score per contained NLW, for example a set of NLWs in the OQWS and an indexed set in the elected IAI. To calculate the SWS, for each NLW in the OQWS, a matching IKW REF is searched for in the tested IAI's ILOR, and if a match is found, a score is calculated. The meaning of a match in this case is either an identical word, or an equivalent word or expression (such as a synonym). The score is accomplished by combining the SL score of the IKW REF with the SL score of the NLW in both the OQWS and the respectively equivalent IKW REF, for example by multiplying the respective SL scores, and optionally applying a penalty or bonus for a high difference or high similarity between the two SL scores, respectively. The combined scores from all NLWs and equivalent IKWs, respectively, are accumulated to create the SWS. An example is given below.

Figure 3A:
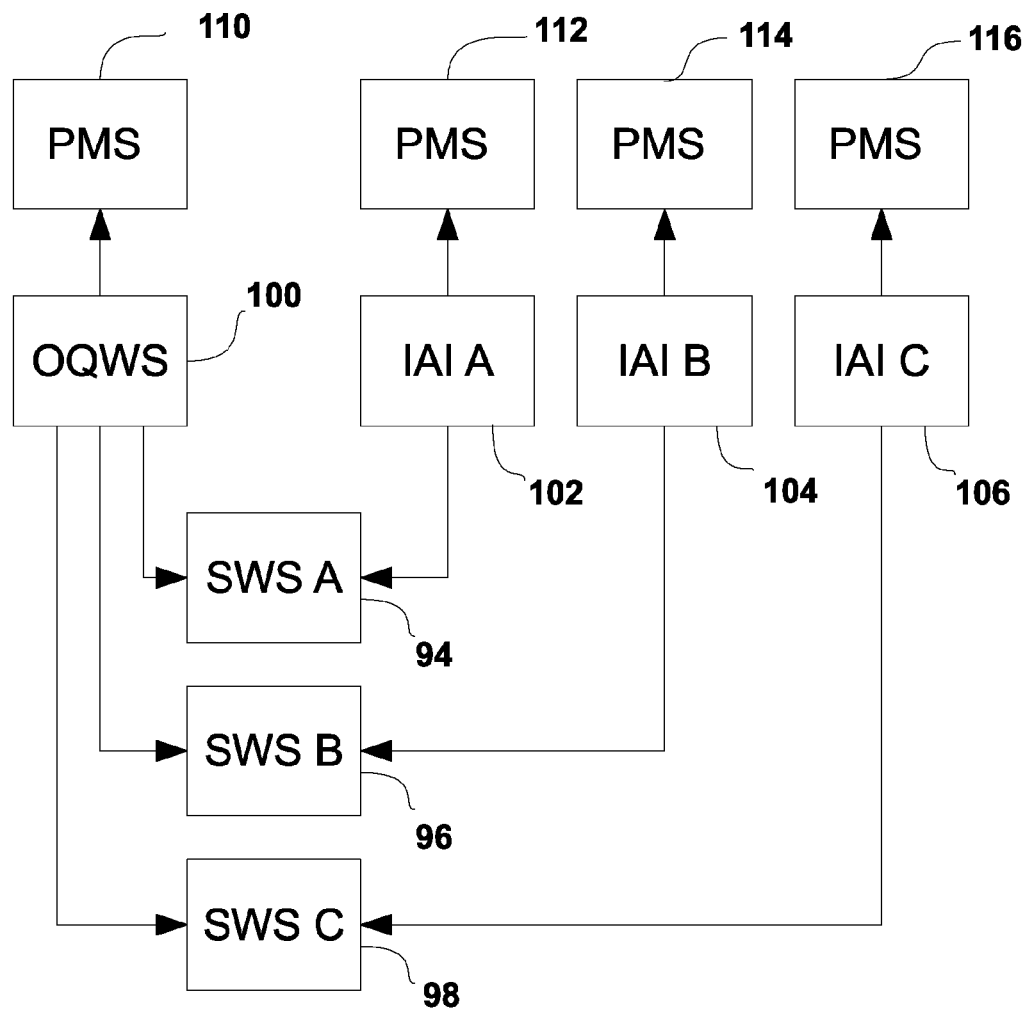
FIGS. 3A-B are graphical presentations of the sequence of events carried out to produce similar word scores of the comparison types.
Figure 3B:
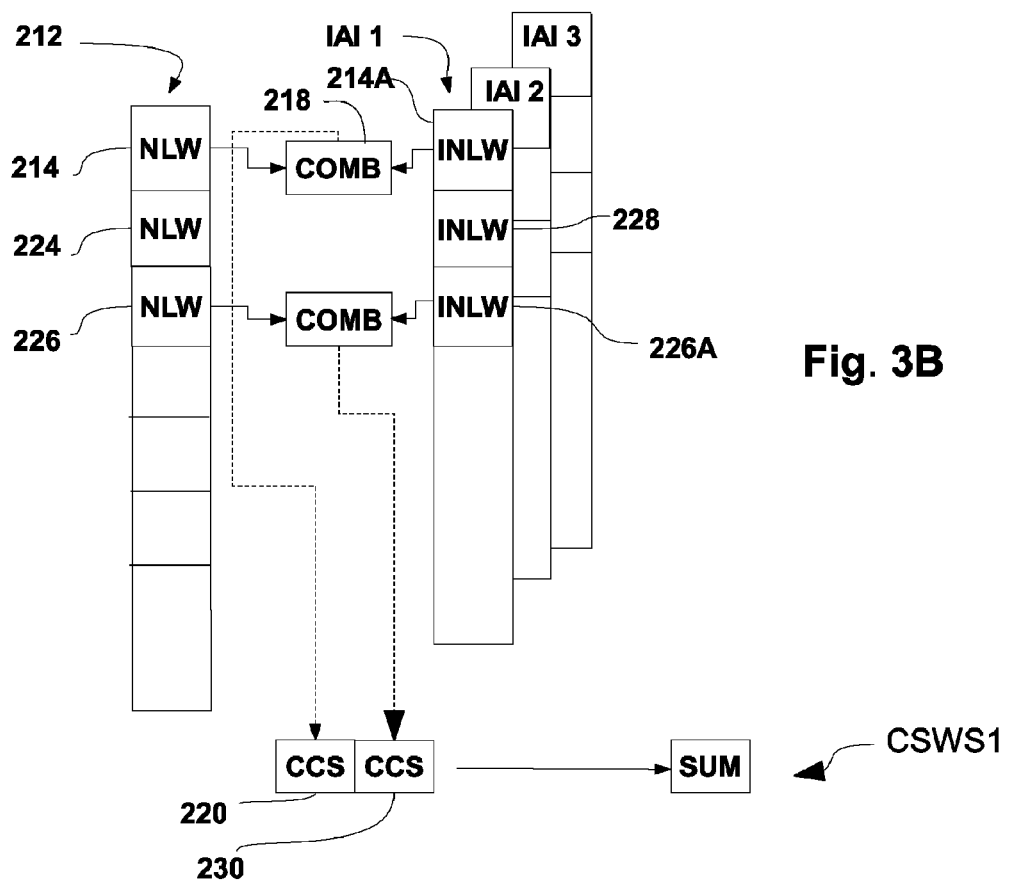
Figure 3C:
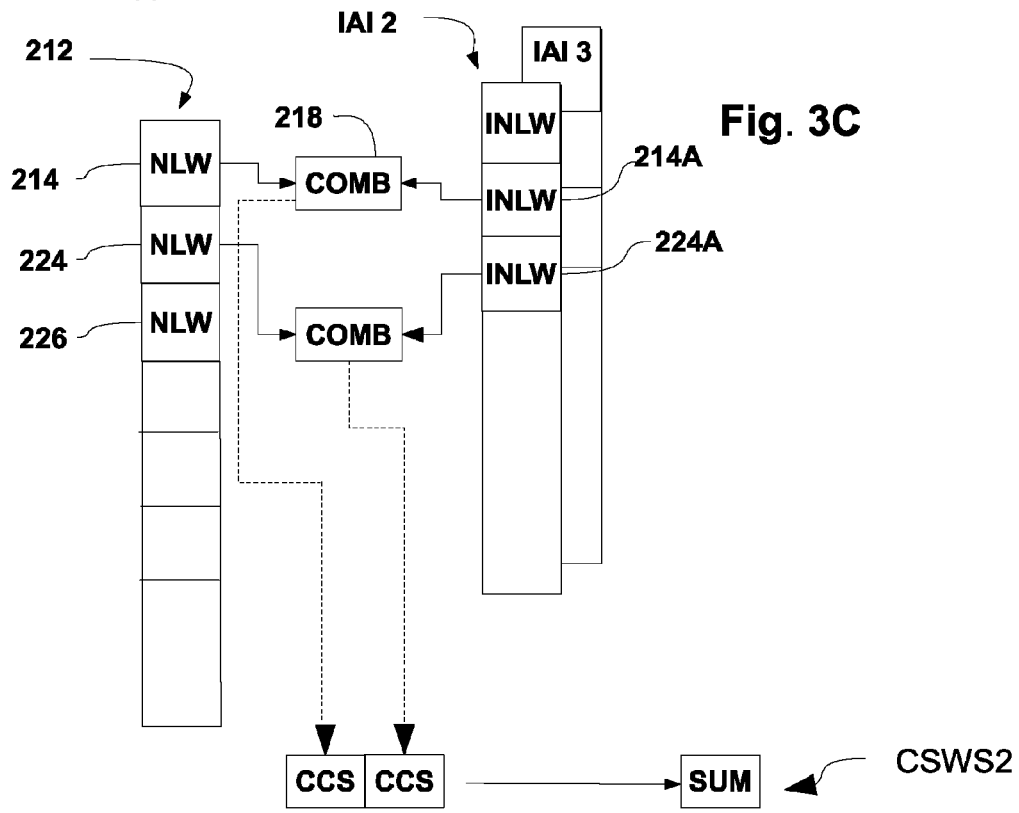

In addition to the MLS calculation accomplished by comparing the elected IAI and the OQWS and obtaining the pertinent SWS score, another type of SWS score is obtained. This other type is obtained by computing the self matching for each elected IAI, or in other words using own components for each respective elected IAI only and in a similar way by self matching regarding the OQWS. These two SWS sub-types are referred to hereinafter in general as Perfect-Match-Scores (PMSs). As can be seen in FIG. 3A, SWSs 94, 96 and 98 are generated in a procedure that exploits the difference between a OQWS 100 of an IQ, and the elected IAIs obtained during the run of the SFBMP procedure, using both the OQWS and the respective IAIs, IAI 102, IAI 104 and IAI 106. The two sub-types of PMSs typically generate the highest possible SWS for each respective NLW set, accordingly. PMS 110 results from self comparing of the OQWS words and PMS 112, 114 and 116 results from the self comparing of IAI 102 to IAI 106, respectively. In FIG. 3B, the computation of SWSs calculated for the comparison of an elected IAI with the OQWS, and referred to hereinafter as CSWS, is pictorially explained. OQWS 212 contains a list of NLWs arranged in the order of the SL scores. Several IAIs found as described above due to their containment of indexed natural language words (INLWs), IAI 1, IAI2 and IAI3, all contribute, in an order of their SL scores, combining to form SWS. Thus, the respective SL scores of NLW 214 of OQWS 212 are combined with INLW 214A in accordance with a calculation rule 218. A combination computation score (CCS) 220 is obtained. Then, NLW 224 is found no match in IAI1, but NLW 226 combined as before (same rule 218) with INLW 226A of IAI 1, to yield CCS 230, the order of computation dictated by a traversal strategy discussed above. The CCSs are summed up to produce a CSWS, and the number of CCSs produced or used for calculating the CSWS is predetermined or dynamically determined or not limited at all. After the traversal of IAI1 is completed, or in parallel, as in FIG. 3C the INLWs of IAI2 are traversed and combined with equivalents, if available, in an order dictated by the according to traversal strategy. CSWS2 is produced by summing up the CCSs.

Finally, in the second step, the MLS calculation includes the combining of the difference between (a) the SWS, and (b) each of the two PMSs generated as described above. The combining is not necessarily balanced, meaning, for example, that the difference between the CSWS and the PMS may receive a higher factor in the calculation of the final MLS and vice versa.

For example:
1. PMS for a OQWS with 2 NLWs having SL scores 100 and 50 respectively is calculated as follows (such a typical calculation multiplying each score by itself as if a match was found):
   (100*100+50*50)=12,500
2. PMS for IAI with 2 NLWs with SL scores 100 and 70 respectively is:
   (100*100+70*70)=14,900
3. CSWS (assuming that only the 1 NLW appears in both items, and that NLW is the one that scored 100 in both sets of keywords, each of the SWS), is calculated as follows:
   (100*100)=10,000.

4. The difference between the CSWS and the OQWS PMS is:
(12,500*10,000)=2,500,
and the difference with the IAI PMS is:
(14,900–10,000)=4,900.
In this example the IAI PMS difference factor is 0.3, smaller than unity, resulting in a final MLS score of:
(2,500*1+4,900*0.3)=3,970.

Using the CSWS and the PMS results is a good estimation of similarity between the matched items. However, The reason that a simple SWS matching does not provide a good enough indication of similarity between an IQ and an IAI lies in the nature of NL queries, which dictates that any added NL word to a query may alter its meaning, and thus should yield different results.

For example:

Assuming a SI containing 2 IAIs: "Definition of Algorithm", as IAI1 and "What is the best known algorithm for image processing", as IAI2. Matching both IAIs with the IQ "What is an algorithm", a person can easily deduce that the better match is IAI1: "Definition of Algorithm". Using only the SWS for comparison, will generate a higher score for IAI2 because it contains all of the NL words from the Query, while IAI1 includes only 1 matching word, and thus using only the SWSs will result in a bad match.

However, a quick look at the difference between the PMS and the CSWS will show that due to the excess of words in IAI2 with respect to the number of words in IQ1, the PMS will be much higher and thus result in a higher difference, while at the same time, the PMS for the IQ will be lower and much closer to the PMS of IAI1 and will result in a very small difference—prioritizing it as the better match.

Using difference based scoring allows detecting the difference of meaning between long queries to short items in the index SI and vice-versa, effectively and quantitatively describing the difference between general and specific queries, and general and specific Knowledge-base entries (IAIs in the present disclosure).

Typically, PMS scores for IAIs can be stored in the index to avoid re-calculation during each comparison.

Limiting Index Traversal

As the MLS for each traversed IAI is calculated during the traversal, and considering that traversal of the index generally starts from highest SL scoring NLW in the OQWS and either highest or best matching SL in the respective IKW LOR (depending on the used search strategy), it can be assumed that traversal follows the order of probability for finding good matches, meaning that the longer traversal continues, the less probable it is to find a better matching IAI than was already traversed. For that reason, in another aspect of the invention, a limitation of traversal is applied, that aims to stop the traversal of IKW LOR when the perceived resulting MLS degradation rises beyond a certain threshold to shorten the search process and decrease resource consumption. The traversal limitation is achieved typically by using the best MLS calculated in the course of a current traversal or current search operation (that may include the traversal of a plurality of LORs), and monitoring for degradation beyond a specific level, for example, when the calculated MLS for a traversed IAI is at least 2 times higher from the lowest (and best) MLS score observed during current LOR traversal.

Plurality of Reference Lists for a Single IAI

In the example of selecting a best matching indexed answer item for an IQ described above, each IAI had one single list of references associated. Each successive reference in that list has a decreased or equal SL with respect to the preceding one. In yet another aspect of the invention, a IAI may be associated with a plurality of reference lists. To explain the consequences of such a possibility reference is made to FIG. 4. IAIa designated 292, is associated with several different reference lists, such as reference lists 294 and 296 respectively. Thus, for a specific reference list, different PMS and SWS scores may be obtained, indicating different best matches for different IQs.

The reason for the existence of multiple reference lists is associated with several aspects of linguistic diversity, for example, usage of similar but different words to indicate a specific entity, spelling mistakes, or different variants of a same language. Comparison between quality of total scores associated with different reference list can be used to correct spelling mistakes, or unify spelling in the pre-processing procedure mentioned above.

Adding New IAIs to the Index and Removing Others

The process of adding IAIs into the index is a relatively straight-forward process, having understood the scoring and matching process of the invention. The basis for adding IAIs into the index is the creation of the IAI's ILOR.

To add a new IAI to the index, first an ILOR must be created with IKW REFs that is to be used to access the IAI. Typically, the ILOR is created by converting an IQ's OQWS to an IKW REF, by converting each NLW in the IQ's OQWS to an IKW REF with the same SL score that was calculated for the NLW in the OQWS. Each of the IKW REFs in the ILOR is then inserted into the appropriate IKW LOR in the index, at its appropriate sorted position. The addition of a new IAI item mandates an update of the SL score of the affected NLWs in both the private storehouse 26 and the language storehouse 30, as the occurrence frequency of the NLWs changes (additional occurrences have been presented). This change in SL score changes the potential SL scores and SWS and MLS scores of the entire search operation and requires a maintenance process to ensure consistency throughout the SI.

Removing IAIs from the SI is the simple process of removing the IKW REFs from their respective LOR. This change also affects the frequency of the referenced NLWs and maintenance is required.

Maintenance of the SI and Language Storehouses

As the occurrence frequency of NLWs changes (due to addition of new IAIs, removal of IAIs etc.), the change normally affects the SL score of IKW REFs in the SI and possibly other indexes as well, as the NLW SL score of each IKW REF changes in accordance with the NLW SL score in both the private storehouse 26 and the language storehouse 30. Therefore, a subsequent re-calculation and re-positioning of every affected IKW REF should be applied. In addition, the SL score of NLWs and IKWs themselves is changed.

In another aspect of the invention, re-calculation and re-factoring of the various index entities (i.e NLW, IKW REF etc.), which will be referred to hereinafter as the maintenance process, is managed in a way to only perform maintenance on IKW LORs that their associated NLW SL score has been modified beyond a specified factor, effectively limiting the amount of maintenance performed on the index considerably while still performing maintenance on items that are affected the most. Concurrently, the language and private storehouses of words are recompiled as a part of the maintenance process.

The invention claimed is:

1. A method for finding a best match for an incoming query (IQ) entered in the form of natural language sentences, with stored and indexed answer items, said method comprising:

maintaining a language storehouse of weighted words for any specific natural language and compiling a private storehouse of weighted words for a search index related to a specific field of knowledge;

receiving said query;
applying a pre-processing procedure for at least assigning a private storehouse of weighted words to an IQ;
fragmenting said IQ and forming a list natural language words (NWLs);
submitting each one of said NLWs to a contesting routine, wherein said contesting routine assigns a significance level score to each NLW based upon reference to both said private storehouse of weighted words and to said language storehouse of weighted words;
reordering said NLWs in an ordered query word succession (OQWS) according to their respective significance level score;
submitting said word succession to a procedure for finding a best match with stored indexed answers, said procedure comprising:
conducting a search for at least one word in said OQWS, starting with the NLW having a highest score, beginning by associating each of the at least one word with an equivalent word in the private storehouse of weighted words, wherein said equivalent word points at a list of reference keywords, each such reference keyword pointing at a stored indexed answer,
accumulating indexed answer items (IAIs) of potential match with said OQWS;
calculating a match level score (MLS) in two steps, first calculating two types of similar word scores (SWSs) one type of which is a SWS resulting from a comparison between each of said elected IAIs and the IQ, and the second type of which is achieved by computing said elected IAIs with respect to their own components and by computing said OQWS with respect to its own components, respectively and then, in the second step, combining the difference between the SWS of the first type and of the second type, the combination being addressed as Match Level Score (MLS) selecting the lower MLS obtained to match an indexed answer to an IQ; and
ordering words of said IQ in a sequence reflecting the significance level score of each word of said query, wherein said significance level score was obtained by contesting said each word of said Query with a list of ordered words, each having a significance level relating to their respective usage frequency;
forming a list of stored candidates of answers to said IQ, based upon a minimal number of common significant words, and
selecting out of said list a matching answer based at least partially on the accumulated score resulting from the summation of significance level score of the significant words as compared with the equivalent of said stored candidates.

2. The method for finding a best match for an incoming query (IQ) according to claim 1, wherein said maintaining of said language storehouse of weighted words and maintaining of said private storehouse of weighted words, factors occurrence frequency of natural words, scores of indexed NLWs, and references to indexed natural words.

3. The method for finding a best match for an incoming query (IQ) according to claim 1, wherein new indexed answers are added into said index and old indexed answers removed, and wherein said addition is essentially transforming a OQWS and assigning references to each NLW thereof.

4. A system comprising a processor for providing at least one answer to a user who inputs a question in the form of electronic signals representing natural language words conveyed to said system by way of a network connected to a computer, said system comprising:
at least one search index relating to a field of knowledge in a specific natural language;
one store house of natural words associated with each one of said at least one search index, wherein a list of natural words is maintained in an order reflecting the usage frequency of said words in said list;
a language storehouse of natural words common to each of said at least one search indexes associated with a specific natural language; said search index comprising:
a list of score ordered keywords;
indexed answer items each associated with an internal list of references (ILOR) pointing to it;
a list of ordered numerical references associated with every one of said ordered keywords, wherein each such reference represents quantitatively an association between said keyword and an indexed answer item;
a language storehouse of weighted words for any specific natural language and a private storehouse of weighted words for a search index related to a specific field of knowledge;
a processor running:
(1) a pre-processing procedure for assigning a private storehouse of weighted words to an IQ;
(2) a process for fragmenting said IQ and forming a list of natural language words (NLWs);
(3) a process for submitting each one of said NLWs to a contesting routine, wherein said contesting routine assigns a significance level score to each NLW based upon reference to both said private storehouse of weighted words and to said language storehouse of weighted words;
(4) a process for reordering said NLWs in an ordered query word succession (OQWS) according to their respective significance level score;
(5) a process for submitting said word succession to a procedure for finding a best match with stored indexed answers, said procedure comprising:
conducting a search for at least one word in said OQWS, starting with a NLW having highest score, beginning by associating each of the at least one word with an equivalent word in the private storehouse of weighted words, wherein said equivalent word points at a list of reference keywords, each such reference keyword pointing at a stored indexed answer;
accumulating indexed answer items (IAIs) of potential match with said OQWS;
calculating a match level score (MLS) in two steps, first calculating two types of similar word scores (SWSs) one type of which is a SWS resulting from a comparison between each of said elected IAI and the IQ, and the second type of which is achieved by computing said elected IAIs with respect to their own components and by computing said OQWS with respect to its own components, respectively and then, in the second step, combining the difference between the SWS of the first type and of the second type, the combination being addressed at Match Level Score (MLS); and
selecting the lower MLS obtained to match an indexed answer to an IQ.

* * * * *